United States Patent
Sieber

(10) Patent No.: US 6,994,736 B2
(45) Date of Patent: Feb. 7, 2006

(54) USE OF PIGMENT DYES FOR DISPERSION DYEING FROM AQUEOUS MEDIA

(75) Inventor: Helmut Sieber, Rheinfelden (DE)

(73) Assignee: Clariant Finance (BVI) Limited, Tortola (VG)

( * ) Notice: Subject to any disclaimer, the term of this patent is extended or adjusted under 35 U.S.C. 154(b) by 0 days.

(21) Appl. No.: 10/466,791

(22) PCT Filed: Jan. 21, 2002

(86) PCT No.: PCT/IB02/00186

§ 371 (c)(1),
(2), (4) Date: Jul. 18, 2003

(87) PCT Pub. No.: WO02/057536

PCT Pub. Date: Jul. 25, 2002

(65) Prior Publication Data

US 2004/0048956 A1    Mar. 11, 2004

(30) Foreign Application Priority Data

Jan. 22, 2002 (GB) ................................. 0101546

(51) Int. Cl.
*D06P 1/44* (2006.01)
*D06P 3/52* (2006.01)

(52) U.S. Cl. .............. 8/637.1; 8/506; 8/922; 8/933

(58) Field of Classification Search .......... 8/506, 8/637.1, 922; 524/90
See application file for complete search history.

(56) References Cited

U.S. PATENT DOCUMENTS

| | | | |
|---|---|---|---|
| 3,549,611 A | 12/1970 | Altermatt et al. | 260/156 |
| 3,676,051 A | 7/1972 | Kangle et al. | 8/65 |
| 5,830,931 A * | 11/1998 | Pelster et al. | 524/90 |
| 5,910,624 A | 6/1999 | Wanken et al. | 8/533 |
| 2001/0004780 A1 | 6/2001 | Mach et al. | 8/478 |

FOREIGN PATENT DOCUMENTS

| | | |
|---|---|---|
| DE | 2 009 465 | 9/1970 |
| DE | 34 13603 | 10/1985 |
| EP | 1 111 124 | 6/2001 |
| FR | 1 445 371 | 8/1993 |
| GB | 1 081 525 | 8/1967 |
| GB | 1 095 035 | 12/1967 |
| GB | 1 413 512 | 11/1975 |
| GB | 1 505 009 | 3/1978 |
| GB | 1 564 231 | 4/1980 |
| GB | 2 105 348 | 3/1983 |

OTHER PUBLICATIONS

English abstract for DE 2009465, Sep. 9, 1971.
English abstract for DE 3413603, Oct. 24, 1985.
English abstract for FR 1445371, Aug. 31, 1993.

* cited by examiner

*Primary Examiner*—Margaret Einsmann
(74) *Attorney, Agent, or Firm*—Tod A. Waldrop

(57) ABSTRACT

Use of pigments according to formula (I)

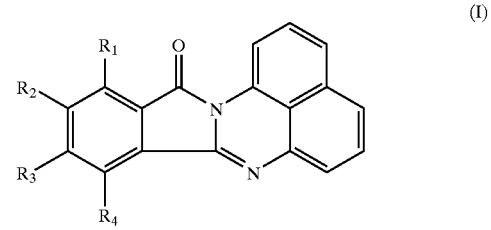

wherein the substituents have the meanings as defined in claim 1 for dyeing semisynthetic or synthetic hydrophobic fiber materials in aqueous media as well as semisynthetic or synthetic hydrophobic fiber materials dyed with such pigments.

8 Claims, No Drawings

USE OF PIGMENT DYES FOR DISPERSION DYEING FROM AQUEOUS MEDIA

The invention relates to the use of certain pigments as disperse dyestuffs in aqueous media.

The word "pigment" is of Latin origin (pigmentum) and originally denoted a color in the sense of a coloring matter, but was later extended to indicate colored decoration (e.g., makeup). In the late Middle Ages, the word was also used for all kinds of plant and vegetable extracts, especially those used for coloring. The word pigment is still used in this sense in biological terminology; it is taken to mean dyestuffs of plant or animal organisms that occur as very small grains inside the cells or cell membranes, as deposits in tissues, or suspended in body fluids.

The modern meaning associated with the word pigment originated in this century. According to accepted standards (DIN 55943 and DIN 55945) the word pigment means a substance consisting of small particles that is practically insoluble in the applied medium and is used on account of its coloring, protective, or magnetic properties. Both pigments and dyes are included in the general term "coloring materials", which denotes all materials used for their coloring properties. The characteristic that distinguishes pigments from soluble organic dyes is their low solubility in solvents and binders. Pigments can be characterized by their chemical composition, and by their optical or technical properties.

In the Color Index (C.I.) pigments are usually named "C.I. Pigment XY xy". Some compounds may be named "C.I. Solvent XY xy" due to their migration tendency in polymer application, although in water or organic solvents these compounds may fulfill the insolubility criteria for pigments, according to DIN 55943 and DIN 55945.

Pigments can be classified into two categories:
(i) inorganic pigments
(ii) organic pigments The most important areas of use of pigments are paints, varnishes, plastics, artists' colors, printing inks for paper and textiles, leather decoration, building materials (cement, renderings, concrete bricks and tiles—mostly based on iron oxide and chromium oxide pigments), leather imitates, floor coverings, rubber, paper, cosmetics, ceramic glazes, and enamels.

The paint industry uses high-quality pigments almost exclusively. An optimal, uniform particle size is important because it influences gloss, hiding power, tinting strength, and lightening power. Paint films must not be too thick, therefore pigments with good tinting strength and hiding power combined with optimum dispersing properties are needed.

White pigments are used for white coloring and covering, but also for reducing (lightening) colored and black pigments. They must have a minimal intrinsic color tone.

When choosing a pigment for a particular application, several points normally have to be considered. The coloring properties (e.g., color, tinting strength or lightening power, hiding power) are important in determining application efficiency and hence economics. The following properties are also important:
1) General chemical and physical properties: chemical composition, moisture and salt content, content of water-soluble and acid-soluble matter, particle size, density, and hardness
2) Stability properties: resistance toward light, weather, heat, and chemicals, anti-corrosive properties, retention of gloss
3) Behavior in binders: interaction with the binder properties, dispersibility, special properties in certain binders, compatibility, and solidifying effect One important field of application is the mass dyeing of polymer fibers, in particular polyester fibers. The process, wherein the polymer melt is directly dyed and spun is called "spin dyeing". The pigment dye is "dissolved" in the polymer melt, e.g. for polyester at temperatures above 260° C. For the melt spinning process the temperatures are usually higher, e.g. for polyester at around 285° C. There are only few pigment classes which can resist these high temperatures without significant degradation of the dye molecule.

Disperse dyes are colorants with low water solubility that, in their disperse colloidal, form, are suitable for dyeing and printing hydrophobic fibers and fabrics.

Models for the dyeing of polyester fibers with disperse dyes have been developed. When the dye is applied from aqueous medium, it is adsorbed from the molecularly dispersed aqueous solution onto the fiber surface and then diffuses into the interior of the fiber. The following parameters determine the rate of dyeing and, to some extent, the leveling properties:
(1) the dissolution rate during the transition from the dispersed crystalline state of the dye into the molecularly dispersed phase, and
(2) the diffusion rate at the fiber surface and, especially, in the interior of the fiber.

The rates of both processes vary with temperature.

Differences in geometry and polarity of the dye molecules can lead to wide variations in these finishing or dye-specific properties and can have a marked effect on the absorption characteristics of all dyes, irrespective of whether single-component or combination dyeing processes are used. For instance, uneven dyeing may occur when an unequal distribution of particle size results in insufficient dispersion stability and, thus, crystal growth and precipitation at the substrate surface.

As the temperature in the dyeing process is usually below 120° C., the temperature stability of the dye molecules is not of great importance. In some cases the temperature in the dyeing process can be up to 130–140° C. Industrially applied disperse dyes are based on numerous chromophore systems. Approximately 60% of all products are azo dyes and ca. 25% are anthraquinone dyes, with the remainder distributed among quinophthalone, methine, naphthalimide, naphthoquinone, and nitro dyes. The dye molecules are usually modified by extensive substituents to optimize their properties according to the product to be dyed.

Surprisingly, it was found that certain pigments used for mass dyeing of polymer fibers, in particular polyester fibers (e.g. pigments of the trademarks Polysynthren® and Sandoplast® both Trademarks of CLARIANT) can be used for dyeing textile fibers in aqueous media.

There is a limited range of pigments, of very different chemical structure, used as dispersion dyes for mass dyeing of polyester. Common elements are that they have rather symmetrical, compact and rigid structures with rather limited side groups, optimized in their stability at the high temperatures of the spin dying process.

Preferred examples for Polysynthren® and Sandoplast® pigments which can be used according to the invention are listed in the Color Index as C.I. Solvent Red 135 and C.I. Solvent Orange 60.

The invention related to the use of pigments or mixtures of pigments according to formula (I)

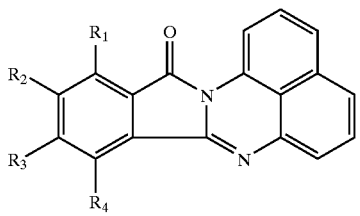

wherein $R_1$–$R_4$ independently from each other signify H, halogen, —$NO_2$, —CN, —OH, —$CH_3$, —$NH_2$ or $NHCH_3$, in a dyeing process which takes place in aqueous media.

Preferably, pigments or mixtures of pigments are used wherein $R_1$–$R_4$ independently from each other signify H, halogen or —CN.

More preferably, pigments or mixtures of pigments are used wherein $R_1$–$R_4$ independently from each other signify H, —Cl or —CN.

Especially preferred are pigments of formula (I) or mixtures of pigments of formula (I) wherein all $R_1$–$R_4$ are either H or —Cl.

The pigment, wherein all $R_1$–$R_4$ of formula (I) are —Cl, is known as C.I. Solvent Red 135 (Polysynthren® Red GFP, Trademark of CLARIANT).

The pigment, wherein all $R_1$–$R_4$ of formula (I) are H, is known as C.I. Solvent Orange 60 (Sandoplast® Orange 3G, Trademark of NOVARTIS).

According to the invention, the pigments of formula (I) are used for dyeing and printing semisynthetic and, preferably, synthetic hydrophobic fiber materials, especially textile materials. Textile materials consisting of blended fabrics containing such semisynthetic hydrophobic fiber materials can also be dyed or printed by means of the dyes of this invention.

Suitable semisynthetic textile materials are mainly cellulose 2½ acetate, cellulose tri-acetate polyamides and high molecular weight polyesters as well as mixtures thereof with cellulose.

Synthetic hydrophobic textile materials consist mainly of linear aromatic polyester, for example of those consisting of terephthalic acid and glycols, in particular ethylene glycol or condensate of terephthalic acid and 1,4-bis(hydroxymethyl)cyclohexane; of polycarbonates, e.g. those consisting of alpha,alpha-dimethyl-4,4'-dihydroxydiphenyl-methane and phosgene, and of fibers based on polyvinyl chloride and polyamide.

The hydrophobic synthetic materials can be in the form of sheet-like or thread-like structures, and can be processed, for example, to yarns or woven, knitted or looped textile fabrics. The pigments of formula (I) are also suitable for dyeing hydrophobic synthetic material in the form of micro fibers.

It is expedient to convert the pigments according to formula (I) before use, into a dye formulation. This is done by milling the dye to an average particle size of 0.1 to 10 micron. Milling can be carried out in the presence of dispersants. Typically, the dried pigment is milled with a dispersant, and thereafter dried under vacuum or by spray drying. Printing pastes and dyebaths can be prepared by adding water to the formulation so obtained.

The pigments according to formula (I) are applied to the textile materials by known dyeing or printing methods, e.g. those described in French patent application No. 1445371.

Typically, polyester fiber materials are dyed from an aqueous dispersion by the exhaust process in the presence of customary anionic or non-ionic dispersants and in the presence or absence of customary swelling agents (carrier) in the temperature range from 65° C. to 140° C.

Cellulose-2½-acetate is preferably dyed at a temperature from 65° C. to 85° C. and Cellulose triacetate at temperatures of up to 125° C.

The pigments according to formula (I) are suitable for dyeing by the thermosol process, for the exhaust and continuos process and for printing as for modern imaging processes, e.g. thermo-transfer printing or ink-jet printing.

The dyeings are carried out from an aqueous liquor by the exhaust process, and the liquor ratio can be chosen from a wide range, for example from 1:4 to 1:100, preferably from 1:6 to 1:50.

The dyeing time is from 20 to 90 minutes, preferably from 30 to 80 minutes.

The dye liquors can additionally comprise other additives, for example dyeing auxiliaries, dispersants, wetting agents and antifoams.

The liquor may also comprise mineral acids, such as sulfuric acid or phosphoric acid, or conveniently also organic acids, for example formic acid or acetic acid and/or salts, such as ammonium acetate or sodium sulfate. The acids mainly serve to adjust the pH of the dye liquors which is preferably in the range from 4 to 5.

The pigments are usually present in the dye liquors in the form of a fine dispersion. Suitable dispersants for the preparation of this dispersion are e.g. anionic dispersants, such as aromatic sulfonic acid/formaldehyde condensates, sulfonated creosol oil/formaldehyde condensates, lignin sulfonates or copolymers of acrylic acid derivates, preferably aromatic sulfonic acid/formaldehyde condensate or lignin sulfonated, or nonionic dispersants based on polyalkylene oxides obtainable, for examples, by poly-addition reaction from ethylene oxide or propylene oxide. Further suitable dispersants are listed in U.S. Pat. No. 4,895,981 or U.S. Pat. No. 5,910,624.

The dyeings or printings thus obtained, have good all-round fastness; particularly noticeable are the thermo-migration fastness, light fastness, thermo-fixation-, and pleating fastness, as well as the excellent wet fastness.

The invention further relates to semisynthetic or, preferably, synthetic hydrophobic fiber materials, which were dyed or printed with pigments of formula (I).

In the following examples, the parts and percentages are by weight. The temperatures are given in degrees Celsius.

APPLICATION EXAMPLE 17.5 parts of the pigment of the following formula (Ia)

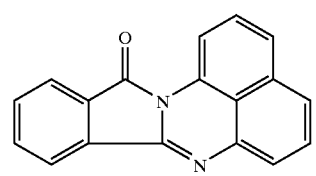

with 32.5 parts of a commercial dispersing agent based on lignin sulphonates, and pulverized to a powder. 1.2 parts of this dye preparation are added to 2000 parts of demineralized water of 70° C., which contains 40 parts of ammonium sulfate; the pH value of the dye bath is set at 5 with 85% formic acid. 100 parts of washed polyester fiber fabric are placed in this dye bath, the container is closed, heated to 130° C. over the course of 20 minutes, and dyeing continues for a further 60 minutes at this temperature. After cooling, the polyester fiber fabric is removed from the dye bath, rinsed, soaped and cleansed by reduction with sodium hydrosulphite in the usual way. After thermo-fixation (180° C., 30 min), a orange dyeing is obtained with very good all-round fastness, especially fastness to light and sublimation, in particular excellent wet fastness.

Dyeing polyester yarn can be carried out analogously with the pigment according to the following formula (Ib)

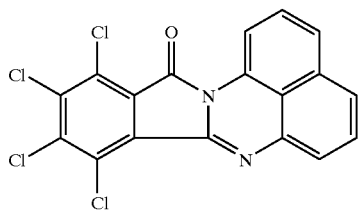

(Ib)

A red dyeing is obtained.

The invention claimed is:

1. A process for dyeing semisynthetic or synthetic hydrophobic fiber material comprising the steps of:

providing at least one pigment according to formula (I)

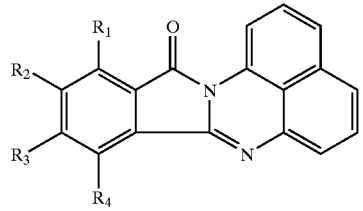

(I)

wherein $R_1$–$R_4$ independently from each other signify H. halogen —$NO_2$, —CN; —OH, —$CH_3$, —$NH_2$ or $NHCH_3$, in an aqueous media;

providing a semisynthetic or synthetic hydrophobic fiber material;

contacting said semisynthetic or synthetic hydrophobic fiber material with said at least one pigment.

2. The process for dyeing semisynthetic or synthetic hydrophobic fiber material according to claim 1, where $R_1$–$R_4$ independently from each other signify H, halogen or —CN.

3. The process for dyeing semisynthetic or synthetic hydrophobic fiber. material according to claim 1 where $R_1$–$R_4$ independently from each other signify H, —Cl or —CN.

4. The process for dyeing semisynthetic or synthetic hydrophobic fiber material according to claim 1, where all $R_1$–$R_4$ are H.

5. A process for the use of a pigment of formula (I)

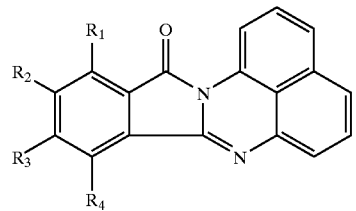

(I)

where $R_1$–$R_{14}$ independently from each other is H, halogen, —$NO_2$, —CN, —OH, —COOH, —$CH_3$, —$NH_2$ or $NHCH_3$, for dyeing polyester hydrophobic fiber material where the dyeing process takes place in an aqueous media comprising the step of contacting at least one pigment according to formula (I) in an aqueous media with semisynthetic or synthetic hydrophobic fiber material.

6. The process for the use of a pigment according to claim 5, where $R_1$–$R_4$ independently from each other signify H, halogen, —COOH. or —CN.

7. The process for the use of a pigment according to claim 5 where $R_1$–$R_4$ independently from each other signify H, —Cl, —COOH, or —CN.

8. The process for the use of a pigment according to claim 5 where all $R_1$–are H.

* * * * *